United States Patent [19]

Ellison

[11] 3,805,037

[45] Apr. 16, 1974

[54] N'TH POWER GALOIS LINEAR GATE

[76] Inventor: James T. Ellison, Univac Pk. P.O. Box 3525, Minneapolis, Minn. 55165

[22] Filed: Mar. 24, 1972

[21] Appl. No.: 237,817

[52] U.S. Cl. .............................. 235/152, 340/166 R

[51] Int. Cl. .............................................. G06f 1/02

[58] Field of Search .................... 235/152, 156, 197; 340/166 R

[56] References Cited

UNITED STATES PATENTS

| | | | |
|---|---|---|---|
| 3,557,356 | 1/1971 | Balza et al. | 235/152 |
| 3,496,545 | 2/1970 | Kolling | 340/166 R |

OTHER PUBLICATIONS

Bartee & Schneider: "Computation With Finite Fields," Information & Control, Vol., 6, June 1963, pp. 82–85.

Gallager, Information Theory & Reliable Communication, Wiley & Sons, 1968, pg. 234.

*Primary Examiner*—Malcolm A. Morrison
*Assistant Examiner*—James F. Gottman
*Attorney, Agent, or Firm*—Kenneth T. Grace; Thomas J. Nikolai

[57] ABSTRACT

A configuration of two-level Boolean elements for implementing an n'th power Galois linear gate on a single medium scale integrated circuit chip is disclosed. The illustrated configuration includes orthogonally arranged sets of four parallel X input lines and four parallel Y input lines having each of their sixteen intersections intercoupled by a two-input AND gate. The outputs of the AND gates are, in turn, coupled to seven internal EXCLUSIVE OR gates and four output EXCLUSIVE OR gates. A separate Z input line is coupled to each of the four output EXCLUSIVE OR gates for providing the function $$G(X)G(Y) + G(Z) = G(XY + Z).$$

5 Claims, 2 Drawing Figures

N'TH POWER GALOIS LINEAR GATE

BACKGROUND OF THE INVENTION

The present invention relates to the field of logic design as particularly directed toward its implementation in digital computers using binary logic. More particularly, the present invention is directed toward the implementation of Galois logic using binary logic devices that operate according to the well-known Boolean algebra, and is related to my copending patent application, ERA-2052, Ser. No. 217,769, filed Jan. 14, 1972.

Galois theory is the study of finite fields first considered by the 19th century French mathematician E. Galois. Since 1948, Galois theory has been widely applied to communication theory where it has lead to efficient error correcting codes. In 1969 in the publication "A Transform for Logic Networks", IEEE Transactions on Computers, Volume C–18, No. 3, March 1969, K. S. Menger, Jr. established a theorem making the use of the Galois theory applicable to network synthesis. However, prior to the present invention no direct application or implementation of Galois theory to network synthesis using two-level (1, 0) logic elements has been known.

SUMMARY OF THE INVENTION

The present invention employs Galois theory to design one of a family of novel MSI (medium scale integrated) circuit chips using binary (Boolean) EXCLUSIVE OR and AND gates. The circuit of the present invention performs the Galois linear operation. The circuit generates the Galois linear resultant $XY + Z$ on four binary (1, 0) output lines from three Galois inputs $X$, $Y$ and $Z$, each input comprised of four binary (1, 0) input lines, i.e., $G(X)G(Y) + G(Z) = G(XY+ Z)$, using the minimum number of binary gates.

The illustrated circuit is comprised of a set of four parallel $G(X)$ input lines and an orthogonal set of four parallel $G(Y)$ input lines. The two input lines of an AND gate are, at each orthogonal intersection of the $G(X)$ and $G(Y)$ input lines, coupled to one of the four $G(X)$ input lines and one of the four $G(Y)$ input lines. The outputs of the AND gates are, in turn, coupled to a plurality of EXCLUSIVE OR gates. Four of the EXCLUSIVE OR gates, identified as the output EXCLUSIVE OR gates, have coupled thereto an associated one of four $G(Z)$ input lines and provide the four output signals that represent the Galois linear resultant $G(XY + Z)$ of the three Galois input signals $G(X)$, $G(Y)$ and $G(Z)$.

DESCRIPTION OF THE PREFERRED EMBODIMENT

With particular reference to Table A there is presented the

TABLE A.—GEOMETRIC CODE $G$ FOR $GF(2^4)$

| $X$ | 0 | 1 | $w$ | $w^2$ | $w^3$ | $w^4$ | $w^5$ | $w^6$ |
|---|---|---|---|---|---|---|---|---|
| $G(X)$.......... | 0000 | 1111 | 1110 | 1101 | 1000 | 0111 | 1001 | 0100 |
| $X$ | $w^7$ | $w^8$ | $w^9$ | $w^{10}$ | $w^{11}$ | $w^{12}$ | $w^{13}$ | $w^{14}$ |
| $G(X)$.......... | 1100 | 1011 | 0010 | 0110 | 1010 | 0001 | 0011 | 0101 |

geometric code $G$ for the Galois field GF($2^n$), where $n$ is a positive integer of 2 or more, and is 4 in the illustrated embodiment of Table A. The generation of codes for the Galois field GF($2^n$) is discussed in the publication "Computation With Finite Fields", T. C. Bartee, et al., Information and Control, Volume 6, pages 79 – 98 (1963). Table A gives correspondence between the members of the 16 element Galois field, specified as GF($2^4$) in algebraic notation, and the 16 possible binary signal states on the four two-level Boolean input lines of the Galois input function $G(X)$; similarly $G(Y)$ and $G(Z)$.

Figure 1:
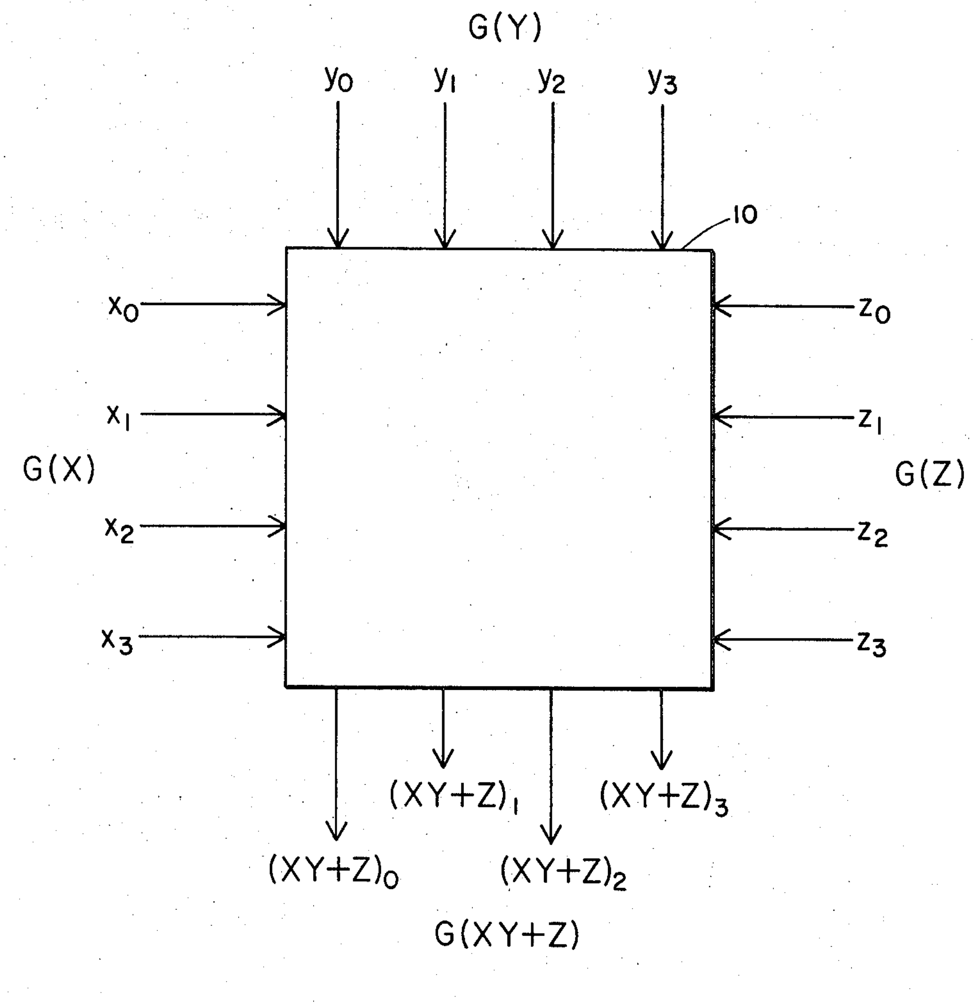
FIG. 1 is an illustration of a block diagram of the novel circuit of the present invention.

With particular reference to FIG. 1 there is presented an illustration of the block diagram of the novel circuit of the present invention. Circuit 10 has as inputs $G(X) = x_0, x_1, x_2, x_3$ $G(Y) = y_0, y_1, y_2, y_3$ $G(Z) = z_0, z_1, z_2, z_3$ providing the output $$G(XY+Z) = (XY+Z)_0, (XY+Z)_1, (XY+Z)_2, (XY + Z_3$$

that is the Galois linear resultant $$G(X)G(Y) + G(Z) = G(XY + Z)$$

Using the 16 members of the Galois field (0, 1, $w$, $w^2$, $w^3$ . . . $w^{14}$) each representing its four two-level coding, e.g., $w^5 = 1001$ as noted in Table A, one may construct the truth table of Table B. Table B systhesizes the Galois multiplication gate for the 16 element Galois field GF($2^4$) in which $G(X)G(Y) = G(XY)$ as disclosed in my above noted copending patent application.

As an example, assume the input functions:

$G(X) = G(w^9) = 0010$ (from Table A)

$x_0 = 0, x_1 = 0, x_2 = 1, x_3 = 0$

| $X$ \ $Y$ | 0 | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ |
|---|---|---|---|---|---|---|---|---|---|---|---|---|---|---|---|---|
| 0.......... | 0 | 0 | 0 | 0 | 0 | 0 | 0 | 0 | 0 | 0 | 0 | 0 | 0 | 0 | 0 | 0 |
| 1.......... | 0 | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ |
| $w$.......... | 0 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ | 1 |
| $w^2$.......... | 0 | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ | 1 | $w$ |
| $w^3$.......... | 0 | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ | 1 | $w$ | $w^2$ |
| $w^4$.......... | 0 | $w^4$ | $w^5$ | $w^6$ | $w^7$ | $w^8$ | $w^9$ | $w^{10}$ | $w^{11}$ | $w^{12}$ | $w^{13}$ | $w^{14}$ | 1 | $w$ | $w^2$ | $w^3$ |
| $w^5$.......... | 0 | $w^5$ | $w^6$ | $w^7$ | $w^8$ | $w^9$ | $w^{10}$ | $w^{11}$ | $w^{12}$ | $w^{13}$ | $w^{14}$ | 1 | $w$ | $w^2$ | $w^3$ | $w^4$ |
| $w^6$.......... | 0 | $w^6$ | $w^7$ | $w^8$ | $w^9$ | $w^{10}$ | $w^{11}$ | $w^{12}$ | $w^{13}$ | $w^{14}$ | 1 | $w$ | $w^2$ | $w^3$ | $w^4$ | $w^5$ |
| $w^7$.......... | 0 | $w^7$ | $w^8$ | $w^9$ | $w^{10}$ | $w^{11}$ | $w^{12}$ | $w^{13}$ | $w^{14}$ | 1 | $w$ | $w^2$ | $w^3$ | $w^4$ | $w^5$ | $w^6$ |

| | Y | | | | | | | | | | | | | | | |
|---|---|---|---|---|---|---|---|---|---|---|---|---|---|---|---|---|
| | 0 | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ |
| $w^8$........ | 0 | $w^8$ | $w^9$ | $w^{10}$ | $w^{11}$ | $w^{12}$ | $w^{13}$ | $w^{14}$ | 1 | $w$ | $w^2$ | $w^3$ | $w^4$ | $w^5$ | $w^6$ | $w^7$ |
| $w^9$........ | 0 | $w^9$ | $w^{10}$ | $w^{11}$ | $w^{12}$ | $w^{13}$ | $w^{14}$ | 1 | $w$ | $w^2$ | $w^3$ | $w^4$ | $w^5$ | $w^6$ | $w^7$ | $w^8$ |
| $w^{10}$........ | 0 | $w^{10}$ | $w^{11}$ | $w^{12}$ | $w^{13}$ | $w^{14}$ | 1 | $w$ | $w^2$ | $w^3$ | $w^4$ | $w^5$ | $w^6$ | $w^7$ | $w^8$ | $w^9$ |
| $w^{11}$........ | 0 | $w^{11}$ | $w^{12}$ | $w^{13}$ | $w^{14}$ | 1 | $w$ | $w^2$ | $w^3$ | $w^4$ | $w^5$ | $w^6$ | $w^7$ | $w^8$ | $w^9$ | $w^{10}$ |
| $w^{12}$........ | 0 | $w^{12}$ | $w^{13}$ | $w^{14}$ | 1 | $w$ | $w^2$ | $w^3$ | $w^4$ | $w^5$ | $w^6$ | $w^7$ | $w^8$ | $w^9$ | $w^{10}$ | $w^{11}$ |
| $w^{13}$........ | 0 | $w^{13}$ | $w^{14}$ | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ |
| $w^{14}$........ | 0 | $w^{14}$ | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ |

TABLE B $XY$ $G(Y) = G(w^{12}) = 0001$ (from Table A)

$y_0 = 0,\ y_1 = 0,\ y_2 = 0,\ y_3 = 1$ $G(Z) = G(w^3) = 1000$ (from Table A)

$z_0 = 1,\ z_1 = 0,\ z_2 = 0,\ z_3 = 0$

The resultant Galois product may then be determined:

$XY = w^9 w^{12} = w^{21}$ (where $w^{15} = 1$)

$= w^{15} w^6$ $= 1 \cdot w^6$ $= w^6$ $G(w^6) = 0100$ (from Table A)

$(XY)_0 = 0,\ (XY)_1 = 1,\ (XY)_2 = 0,\ (XY)_3 = 0$

It can be seen that Table B provides at the intersection of the horizontal argument $X = w^9$ and the vertical argument $Y = w^{12}$ the resultant Galois product $XY = w^6$.

Using the Galois product $XY$ as determined from Table B, one may then use Table C to determine the Galois linear resultant $XY + Z$. Table C is constructed using the 16 members of the Galois field as noted in Table A and as also used to construct Table B. Table C synthesizes the Galois linear function for the 16 element Galois field $G(2^4)$.

Now, having the previously determined Galois product $XY = w^6$ and the given input function $Z = w^3$, one may determine the output function of circuit 10 or the Galois linear resultant thereof which describes the function of circuit 10:

$G(XY) = G(w^6)$ (from Table B)

$G(Z) = G(w^3)$ (given)

$G(WY + Z) = G(w^6 + w^3)$

Then, taking $G(XY) = G(w^6) = 0100$ (from Table A)

$G(Z) = G(w^3) = 1000$ (from Table A)

and performing the EXCLUSIVE OR operation upon these functions as in Table C, $G(XY) = G(w^6) = 0100$ $G(Z) = G(w^3) = 1000$ $G(XY + Z) = G(w^6 + w^3) = \overline{1100}$ It is determined that $G(XY + Z) = G(w^7) = 1100$ (from Table A)

which is the desired Galois linear resultant of the above given input functions $G(X)$, $G(Y)$ and $G(Z)$. It can be seen that Table C provides at the intersection of the horizontal argument $XY = w^6$ and the vertical argument $Z = w^3$ the Galois linear resultant $XY + Z = w^7$.

Figure 2:
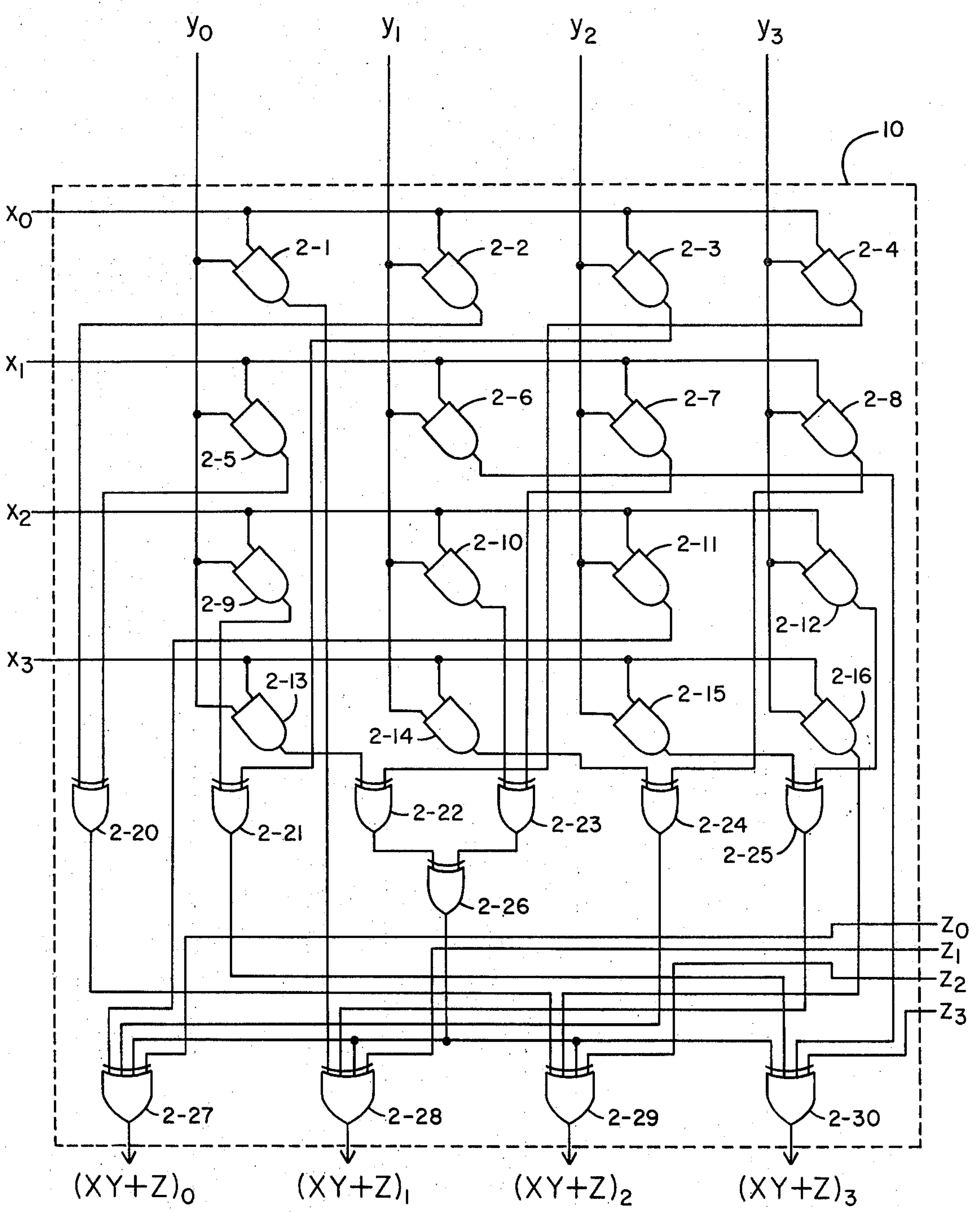
FIG. 2 is a novel circuit design of the two-level Boolean elements implementing the fourth power Galois function.

With particular reference to FIG. 2 there is presented a configuration of two-level Boolean elements for implementing the fourth power Galois linear gate on the medium scale integrated circuit chip as defined by the truth table of Table C. Circuit 10 includes a set of four parallel $X$ input lines $x_0$, $x_1$, $x_2$, $x_3$ and a set of four parallel $Y$ input lines $y_0$, $y_1$, $y_2$, $y_3$ the two sets orthogonally arranged for forming 16 orthogonal intersections $x_0y_0$, $x_0y_1$, etc. Also included are 16, two-input AND gates 2–1 through 2–16, seven, two-input, internal EXCLUSIVE OR gates 2–20 through 2–26 and four, four-input, output EXCLUSIVE OR gates 2–27 through 2–30. Each of the intersections has its associated x and y lines coupled to the respective inputs of a two-input AND gate. The outputs of certain of the AND gates are, in turn, coupled as inputs to a plurality of two-input EXCLUSIVE OR gates 2–20 through 2–25 with the outputs of EXCLUSIVE OR gates 2–22 and 2–23 coupled as inputs to a two-input EXCLUSIVE OR gate 2–26. The outputs of EXCLUSIVE OR gates 2–20 through 2–26 and the remaining outputs of the AND gates not coupled to the EXCLUSIVE OR gates 2–20

| | Z | | | | | | | | | | | | | | | |
|---|---|---|---|---|---|---|---|---|---|---|---|---|---|---|---|---|
| | 0 | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ |
| 0........ | 0 | 1 | $w$ | $w^2$ | $w^3$ | $w^4$ | $w^5$ | $w^6$ | $w^7$ | $w^8$ | $w^9$ | $w^{10}$ | $w^{11}$ | $w^{12}$ | $w^{13}$ | $w^{14}$ |
| 1........ | 1 | 0 | $w^{12}$ | $w^9$ | $w^4$ | $w^3$ | $w^{10}$ | $w^8$ | $w^{13}$ | $w^6$ | $w^2$ | $w^5$ | $w^{14}$ | $w$ | $w^7$ | $w^{11}$ |
| $w$........ | $w$ | $w^{12}$ | 0 | $w^{13}$ | $w^{10}$ | $w^5$ | $w^4$ | $w^{11}$ | $w^9$ | $w^{14}$ | $w^7$ | $w^3$ | $w^6$ | 1 | $w^2$ | $w^8$ |
| $w^2$........ | $w^2$ | $w^9$ | $w^{13}$ | 0 | $w^{14}$ | $w^{11}$ | $w^6$ | $w^5$ | $w^{12}$ | $w^{10}$ | 1 | $w^8$ | $w^4$ | $w^7$ | $w$ | $w^3$ |
| $w^3$........ | $w^3$ | $w^4$ | $w^{10}$ | $w^{14}$ | 0 | 1 | $w^{12}$ | $w^7$ | $w^6$ | $w^{13}$ | $w^{11}$ | $w$ | $w^9$ | $w^5$ | $w^8$ | $w^2$ |
| $w^4$........ | $w^4$ | $w^3$ | $w^5$ | $w^{11}$ | 1 | 0 | $w$ | $w^{13}$ | $w^8$ | $w^7$ | $w^{14}$ | $w^{12}$ | $w^2$ | $w^{10}$ | $w^6$ | $w^9$ |
| $w^5$........ | $w^5$ | $w^{10}$ | $w^4$ | $w^6$ | $w^{12}$ | $w$ | 0 | $w^2$ | $w^{14}$ | $w^9$ | $w^8$ | 1 | $w^{13}$ | $w^3$ | $w^{11}$ | $w^7$ |
| XY $w^6$........ | $w^6$ | $w^8$ | $w^{11}$ | $w^5$ | $w^7$ | $w^{13}$ | $w^2$ | 0 | $w^3$ | 1 | $w^{10}$ | $w^9$ | $w$ | $w^{14}$ | $w^4$ | $w^{12}$ |
| $w^7$........ | $w^7$ | $w^{13}$ | $w^9$ | $w^{12}$ | $w^6$ | $w^8$ | $w^{14}$ | $w^3$ | 0 | $w^4$ | $w$ | $w^{11}$ | $w^{10}$ | $w^2$ | 1 | $w^5$ |
| $w^8$........ | $w^8$ | $w^6$ | $w^{14}$ | $w^{10}$ | $w^{13}$ | $w^7$ | $w^9$ | 1 | $w^4$ | 0 | $w^5$ | $w^2$ | $w^{12}$ | $w^{11}$ | $w^{13}$ | $w$ |
| $w^9$........ | $w^9$ | $w^2$ | $w^7$ | 1 | $w^{11}$ | $w^{14}$ | $w^8$ | $w^{10}$ | $w$ | $w^5$ | 0 | $w^6$ | $w^3$ | $w^{13}$ | $w^{12}$ | $w^4$ |
| $w^{10}$........ | $w^{10}$ | $w^5$ | $w^3$ | $w^8$ | $w$ | $w^{12}$ | 1 | $w^9$ | $w^{11}$ | $w^2$ | $w^6$ | 0 | $w^7$ | $w^4$ | $w^{14}$ | $w^{13}$ |
| $w^{11}$........ | $w^{11}$ | $w^{14}$ | $w^6$ | $w^4$ | $w^9$ | $w^2$ | $w^{13}$ | $w$ | $w^{10}$ | $w^{12}$ | $w^3$ | $w^7$ | 0 | $w^8$ | $w^5$ | 1 |
| $w^{12}$........ | $w^{12}$ | $w$ | 1 | $w^7$ | $w^5$ | $w^{10}$ | $w^3$ | $w^{14}$ | $w^2$ | $w^{11}$ | $w^{13}$ | $w^4$ | $w^8$ | 0 | $w^9$ | $w^6$ |
| $w^{13}$........ | $w^{13}$ | $w^7$ | $w^2$ | $w$ | $w^8$ | $w^6$ | $w^{11}$ | $w^4$ | 1 | $w^3$ | $w^{12}$ | $w^{14}$ | $w^5$ | $w^9$ | 0 | $w^{10}$ |
| $w^{14}$........ | $w^{14}$ | $w^{11}$ | $w^8$ | $w^3$ | $w^2$ | $w^9$ | $w^7$ | $w^{12}$ | $w^5$ | $w$ | $w^4$ | $w^{13}$ | 1 | $w^6$ | $w^{10}$ | 0 |

TABLE C $XY + Z$ through 2–25 and the outputs of the EXCLUSIVE OR gates 2–20, 2–21, 2–24, 2–25 and 2–26 are coupled to the inputs of a plurality of four-input EXCLUSIVE OR gates 2–27 through 2–30. Four, Z input lines $z_0$, $z_1$, $z_2$, $z_3$ are then coupled to the respectively associated four-input EXCLUSIVE OR gates 2–27 through 2–30, respectively. It is to be appreciated that $k$-input EXCLUSIVE OR gates, where $k$ is a positive integer of three or greater, are synonymous to $k$-input parity gates, and may be comprised of the number ($k$-1) of two-input EXCLUSIVE OR gates. See the text "Digital Design", Wiley-Interscience, 1971, R. K. Richards, pages 198 – 200.

What is claimed is:

1. A Galois linear gate, comprising:
$n$,$X$ input lines $x_0, \ldots x_{n-1}$ and $n$,$Y$ input lines $y_0, \ldots y_{n-1}$ for forming the $n^2$ intersections $x_0y_0, x_0y_1, \ldots x_{n-1}y_{n-2}, x_{n-1}y_{n-1}$;
$n^2$, AND gates, a separate one coupled across the $X$ input line and the $Y$ input line of an associated one of said intersections;
a plurality of EXCLUSIVE OR gates;
$n$,$Z$ input lines $z_0, \ldots z_{n-1}$;
each of said $n$,$Z$ input lines coupled as an input to an associated separate one of $n$ of said EXCLUSIVE OR gates;
means intercoupling said $n^2$, AND gates and said EXCLUSIVE OR gates for generating as the outputs of said n of said EXCLUSIVE OR gates the Galois linear resultant
$G(XY+Z) = (XY+Z)_0, \ldots (XY+Z)_{n-1}$,
of the Galois input on said $n$,$X$ input lines of
$G(X) = x_0, \ldots x_{n-1}$,
of the Galois input on said $n$,$Y$ input lines of
$G(Y) = y_0, \ldots y_{n-1}$,
and of the Galois input on said $n$,$Z$ input lines of
$G(Z) = z_0, \ldots z_{n-1}$.

2. A Galois linear gate, comprising:
a matrix array of $n$, $X$ input lines $x_0, \ldots x_{n-1}$ and $n$, $Y$ input lines $y_0, \ldots y_{n-1}$ for forming the $n^2$ intersections $x_0y_0, x_0y_1, \ldots x_{n-1}y_{n-2}, x_{n-1}y_{n-1}$; $n^2$, two-input AND gates, a separate one having its two inputs coupled across the $X$ input line and the $Y$ input line of an associated one of said $n^2$ intersections;
$n$, $Z$ input lines $z_0, \ldots z_{n-1}$;
a plurality of internal EXCLUSIVE OR gates;
$n$, output EXCLUSIVE OR gates;
each of said $n$, $Z$ input lines coupled as an input to an associated separate one of said $n$, output EXCLUSIVE OR gates;
means intercoupling said AND gates, said plurality of internal EXCLUSIVE OR gates and said $n$, output EXCLUSIVE OR gates for generating as the outputs of said $n$, output EXCLUSIVE OR gates the Galois linear resultant
$G(XY+Z) = (XY+Z)_0, \ldots (XY+Z)_{n-1}$,
of the Galois input on said $n$, $X$ input lines of
$G(X) = x_0, \ldots x_{n-1}$,
of the Galois input on said $n$, $Y$ input lines of
$G(Y) = y_0, \ldots y_{n-1}$,
and of the Galois input on said $n$, $Z$ input lines of
$G(Z) = z_0, \ldots z_{n-1}$.

3. A Galois linear gate, comprising:
a matrix array of four, $X$ input lines $x_0$, $x_1$, $x_2$, $x_3$ and four, $Y$ input lines $y_0$, $y_1$, $y_2$, $y_3$ for forming the 16 intersections $x_0y_0, x_0y_1, x_0y_2, x_0y_3, x_1y_0, x_1y_1, \ldots x_3y_2, x_3y_3$;
16 two-input AND gates, a separate one having its two inputs coupled across the $X$ input line and the $Y$ input line of an associated one of said 16 intersections;
four, $Z$ input lines $z_0$, $z_1$, $z_2$, $z_3$;
a plurality of internal EXCLUSIVE OR gates;
four, output EXCLUSIVE OR gates;
each of said four, Z input lines coupled as an input to an associated separate one of said four, output EXCLUSIVE OR gates;
means intercoupling the output of said 16 AND gates,
said plurality of internal EXCLUSIVE OR gates and said four, output EXCLUSIVE OR gates for generating as the output of said four, output EXCLUSIVE OR gates the Galois linear resultant
$G(XY+Z) = (XY+Z)_0, (XY+Z)_1, (XY+Z)_2, (XY+Z)_3$,
of the Galois input on said four, $X$ input lines of
$G(X) = x_0, x_1, x_2, x_3$,
of the Galois product on said four, $Y$ input lines of
$G(Y) = y_0, y_1, y_2, y_3$
and of the Galois input on said four, $Z$ input lines of
$G(Z) = z_0, z_1, z_2, z_3$.

4. A Galois linear gate, comprising:
a matrix array of four $X$ input lines $x_0$, $x_1$, $x_2$, $x_3$ and four $Y$ input lines $y_0$, $y_1$, $y_2$, $y_3$ for forming the 16 intersections $x_0y_0, x_0y_1, x_0y_2, x_0y_3, x_1y_0, x_1y_1, \ldots x_3y_2, x_3y_3$;
16 AND gates each coupled across the $X$ input line and the $Y$ input line of an associated one of said intersections;
11 EXCLUSIVE OR gates;
means coupling the output of the $x_2y_2$ intersection AND gate as a first input of the first of said EXCLUSIVE OR gates;
means coupling the output of the $x_0y_0$ intersection AND gate as a first input of the second of said EXCLUSIVE OR gates;
means coupling the output of the $x_3y_3$ intersection AND gate as a first input of the third of said EXCLUSIVE OR gates;
means coupling the output of the $x_1y_1$ intersection AND gate as a first input of the fourth of said EXCLUSIVE OR gates;
means coupling the output of the $x_0y_1$ intersection AND gate as a first input of the fifth of said EXCLUSIVE OR gates;
means coupling the output of the $x_2y_0$ intersection AND gate as a first input of the sixth of said EXCLUSIVE OR gates;
means coupling the output of the $x_3y_0$ intersection AND gate as a first input of the seventh of said EXCLUSIVE OR gates;
means coupling the output of the $x_2y_1$ intersection AND gate as a first input of the eighth of said EXCLUSIVE OR gates;
means coupling the output of the $x_3y_1$ intersection AND gate as a first input of the ninth of said EXCLUSIVE OR gates;
means coupling the output of the $x_3y_2$ intersection AND gate as a first input of the 10th of said EXCLUSIVE OR gates;
means coupling the outputs of said seventh and eighth EXCLUSIVE OR gates as the first and second, respectively, inputs of the 11th of said EXCLUSIVE OR gates;
means coupling the output of said eleventh EXCLU- SIVE OR gate as a second input of said first, said second, said third, and said fourth EXCLUSIVE OR gates;

means coupling the output of the $x_1y_0$ intersection AND gate as a second input of the fifth of said EXCLUSIVE OR gates;

means coupling the output of the $x_0y_2$ intersection AND gate as the second input of the sixth of said EXCLUSIVE OR gates;

means coupling the output of the $x_0y_3$ intersection AND gate as a second input of the seventh of said EXCLUSIVE OR gates;

means coupling the output of the $x_1y_2$ intersection AND gate as the second input of the eighth of said EXCLUSIVE OR gates;

means coupling the output of the $x_1y_3$ intersection AND gate as a second input of the ninth of said EXCLUSIVE OR gates;

means coupling the output of the $x_2y_3$ intersection AND gate as the second input of the 10th of said EXCLUSIVE OR gates;

means coupling the output of the fifth of said EXCLUSIVE OR gates as a third input of the third of said EXCLUSIVE OR gates;

means coupling the output of the sixth of said EXCLUSIVE OR gates as a third input of the fourth of said EXCLUSIVE OR gates;

means coupling the output of the ninth of said EXCLUSIVE OR gates as a third input of the first of said EXCLUSIVE OR gates;

means coupling the output of the tenth of said EXCLUSIVE OR gates as a third input of the second of said EXCLUSIVE OR gates;

four $Z$ input lines $z_0$, $z_1$, $z_2$, $z_3$;

means coupling said $Z$ input line $z_0$ as a fourth input of the first of said EXCLUSIVE OR gates;

means coupling said $Z$ input line $z_1$ as a fourth input of the second of said EXCLUSIVE OR gates;

means coupling said $Z$ input line $z_2$ as a fourth input of the third of said EXCLUSIVE OR gates;

means coupling said $Z$ input line $z_3$ as a fourth input of the fourth of said EXCLUSIVE OR gates.

5. The improvement that converts a Galois multiplication gate, which Galois multiplication gate generates the Galois product $G(XY) = (XY)_0, \ldots (XY)_{n-1}$ as the output of $n$, output EXCLUSIVE OR gates from the Galois input on $n$, $X$ input lines of $G(X) = x_0, \ldots x_{n-1}$ and from the Galois input on $n$, $Y$ input lines of $G(Y) = y_0, \ldots y_{n-1}$, to a Galois linear gate, comprising:

$n$, $Z$ input lines, a separate one coupled as an input to an associated separate one of said $n$, output EXCLUSIVE OR gates for generating as the output of said $n$, output EXCLUSIVE OR gates the Galois linear resultant $G(XY + Z) = (XY + Z)_0, \ldots (XY + Z)_{n-1}$.

* * * * *